United States Patent [19]

Zurcher et al.

[11] Patent Number: 5,620,149

[45] Date of Patent: *Apr. 15, 1997

[54] FISHING REEL WITH TRIGGER-ACTUATED BAIL ASSEMBLY

[75] Inventors: John A. Zurcher, St. Charles, Mo.; John W. Puryear, Biloxi, Miss.; Hyunkyu Kim, Incheon City, Rep. of Korea; Robert L. Carpenter, Tulsa, Okla.

[73] Assignee: Zebco Corporation, Tulsa, Okla.

[*] Notice: The term of this patent shall not extend beyond the expiration date of Pat. No. 5,613,645.

[21] Appl. No.: 914,261

[22] Filed: Jul. 15, 1992

[51] Int. Cl.⁶ ............................................. A01K 89/01
[52] U.S. Cl. ............................................. 242/233
[58] Field of Search ................................ 242/230–233, 242/311

[56] References Cited

U.S. PATENT DOCUMENTS

| | | |
|---|---|---|
| 2,586,921 | 2/1952 | Delphon . |
| 2,658,697 | 11/1953 | Steinbaugh . |
| 2,665,856 | 1/1954 | Shakespeare et al. . |
| 2,670,908 | 3/1954 | Hill . |
| 2,736,979 | 3/1956 | Le Gal . |
| 2,773,654 | 12/1956 | Hubner . |
| 2,783,952 | 3/1957 | Clay . |
| 2,843,333 | 7/1958 | Jones . |
| 2,966,314 | 12/1960 | Mombur . |
| 3,036,788 | 5/1962 | Gentusa . |
| 3,074,664 | 1/1963 | Beger . |
| 3,095,158 | 6/1963 | Louison . |
| 3,116,894 | 1/1964 | Rule . |
| 3,126,167 | 3/1964 | Ide . |
| 3,226,873 | 1/1966 | Wood . |
| 3,233,845 | 2/1966 | Inamura . |
| 3,342,442 | 9/1967 | Brantingson . |
| 3,743,207 | 7/1973 | McMickle . |
| 3,796,391 | 3/1974 | McMickle . |
| 3,908,927 | 9/1975 | Louison . |
| 4,108,392 | 8/1978 | Masclet . |
| 4,350,312 | 9/1982 | Masclet . |
| 4,676,450 | 6/1987 | Carpenter et al. . |
| 4,921,188 | 5/1990 | Smith . |
| 5,154,369 | 10/1992 | Smith . |

FOREIGN PATENT DOCUMENTS

| | | |
|---|---|---|
| 81743 | 9/1963 | France . |
| 546274 | 11/1957 | Italy . |

Primary Examiner—Michael R. Mansen
Attorney, Agent, or Firm—Wood, Phillips, VanSanten, Clark & Mortimer

[57] ABSTRACT

A fishing reel having a frame, a rotor rotatable relative to the frame about a first axis, a line storage spool, a structure for rotating the rotor to thereby direct line onto the line storage spool and including a bail assembly having first and second bail arms pivotably mounted to the rotor for movement between (a) first position wherein the bail assembly is in a retrieve position and (b) a second position wherein the bail assembly is in a cast position, a bail actuator, and structure responsive to operation of the bail actuator for exerting a force on both of the bail arms to pivot the bail arms from their first position towards their second position.

24 Claims, 6 Drawing Sheets

FISHING REEL WITH TRIGGER-ACTUATED BAIL ASSEMBLY

BACKGROUND OF THE INVENTION

1. Field of the Invention

This invention relates to spinning-type fishing reels having a bail assembly with spaced bail arms pivotably mounted to a rotor and, more particularly, to a mechanism for positively applying a balanced force on the bail arms through an actuating trigger to thereby positively and smoothly pivot the bail assembly from its retrieve position into its cast position.

2. Background Art

Spinning-type fishing reels are well known in the prior art. Typically, a spinning reel has a frame defining a mounting foot for attachment to a rod. A rotor is mounted to the frame for rotation about a fore and aft axis. A line-carrying spool is coaxial with the rotor axis and oscillated in a fore and aft direction by operation of a crank handle, which crank handle operation simultaneously rotates the rotor to thereby evenly wrap line on the line-carrying spool.

To effect a cast with a basic spinning reel, the user picks up the line projecting away from the reel, with a finger on the same hand that holds the rod, and snubs the line against the rod. With the other hand, the user manually pivots the bail assembly from a retrieve position to a cast position. The rod is then cocked and thrust in the direction of the cast. As the rod is thrust, the user moves the line snubbing finger to release the line. Once the cast is completed, the user operates the crank handle to rotate the rotor. A trip mechanism on the moving rotor is automatically actuated by a cam element on the reel frame to force the bail assembly from the cast position back into the retrieve position.

Some fishermen do not like to have to manually grasp and reorient the bail assembly, as is required with the above structure. To accommodate these fishermen, trigger operated bail assemblies have been developed. Exemplary prior art trigger mechanisms are shown in each of U.S. Pat. Nos. 2,658,697, to Steinbaugh, 3,095,158, to Louison, 3,796,391, to McMickle, and 3,908,927, to Louison.

Each of these prior art structures has a movable trigger that is operable to exert a pivot force on a bail assembly to move the ball assembly from its retrieve position into its cast position. In each of these mechanisms, the force from the trigger is exerted through an intermediate mechanism on only one bail arm on one side of the bail assembly. This arrangement may require a substantial force on the trigger to generate the required torque on the bail assembly. To transmit this force, a very sturdy mechanism may be required. The parts of such a mechanism may be costly and heavy. This is very undesirable in the highly competitive fishing industry in which designers strive to provide lightweight construction.

A further drawback with the above prior art structures is that the exertion of the required pivoting force on one side of the bail assembly may result in a canting of the intermediate mechanism and/or the bail assembly. Parts may skew and significant friction may be developed as a result of which the reel may be difficult to operate and/or prone to malfunction.

With the above prior art trigger mechanisms, the user is still required to manually snub the line against the rod during performance of the cast.

The applicant herein, in recent years, introduced to the market a very significant development in the trigger area. Some of the applicant's contribution is described in U.S. Pat. No. 4,921,188, to Smith. The Smith structure utilizes a pin which automatically traps the line on the bail assembly as the reel is placed in a cast mode. The user merely has to operate a trigger which effects (a) pivoting of the bail from its retrieve position into its cast position and (b) positioning of the pin to block the line on the bail assembly. The user releases the trigger as the rod is thrust forwardly to thereby retract the pin to allow the line to pay out. With this arrangement, the user never has to directly touch the line to perform a cast.

Fishing reels incorporating the Smith invention have realized substantial commercial success.

SUMMARY OF THE INVENTION

The present invention is specifically directed to overcoming the above enumerated problems and improving the presently known bail operating mechanisms.

More specifically, the present invention is directed to a fishing reel having a frame, a rotor rotatable relative to the frame about a first axis, a line storage spool, a structure for rotating the rotor to thereby direct line onto the line storage spool and including a bail assembly having first and second bail arms pivotably mounted to the rotor for movement between (a) first position wherein the bail assembly is in a retrieve position and (b) a second position wherein the bail assembly is in a cast position, a bail actuator, and structure responsive to operation of the bail actuator for exerting a force on both of the bail arms to pivot the bail arms from their first position towards their second position.

Because the force produced by the bail actuator is distributed to both of the bail arms, the operating force is balanced. Accordingly, smooth transition between the retrieve and cast positions can be effected without excessively stressing or skewing the parts in the chain between the bail actuator and the bail arms. Because the entire bail operating force does not have to be applied to one bail arm, the components for transmitting forces between the bail actuator and the bail arms can be designed to accommodate lesser forces than in many prior art structures. Accordingly, a lighter weight construction may be employed.

In another aspect of the invention, the force exerting structure exerts a pivot force on only of the first and second bail arms over a portion of the range of movement of the first and second bail arms between their first and second positions. First and second force transmitting arms are pivoted by the bail actuator and thereby cause the pivot arms to be rotated to place the bail assembly in a cast position. A cooperating pin and shoulder arrangement can be used between the force transmitting arms and bail arms.

Normally, a designer deals with the competing interests of optimizing force application through the pin and shoulder arrangement and pivoting the bail assembly through the required range between the retrieve and cast positions. Increasing the range of pivoting for the bail assembly may result in a less than optimum force application on the bail arms particularly at the point when the bail assembly pivoting is initiated. With the timed/staggered operation of the pin and shoulder arrangement on the bail arms, according to the present invention, the designer can, for example, provide a first pin and shoulder arrangement on one of the bail arms that optimizes the force transmission through that pin and shoulder arrangement at the start of the bail assembly rotation. Actuation of the other pin and shoulder arrangement can be slightly delayed, with the other pin and shoulder configured to positively drive the bail assembly fully and positively through the final portion of the pivot range for the bail assembly.

In one form of the invention, the rotor has diametrically opposite ears to which the bail arms are pivotably mounted. The force exerting structure includes first and second force transmission arms mounted to the rotor for pivoting movement relative thereto between third and fourth positions. There is cooperating structure between the force transmission arms and bail arms for causing the first and second force transmission arms to drive the first and second bail arms from their first position into their second position as an incident of the force transmission arms moving from their third position into their fourth position.

In one form, the force exerting structure includes an actuation plate mounted to at least one of the frame and rotor for movement relative thereto between extended and retracted positions. Structure cooperates between the actuation plate and force transmission arms for moving the force transmission arms from their third position into their fourth position as an incident of the actuation plate moving from its retracted position into its extended position.

In one form, the bail actuator is a trigger mounted to at least one of the frame and rotor for pivoting movement relative thereto between a rest position and an operating position, with their being structure cooperating between the trigger and actuation plate for moving the actuation plate from its retracted position into its extended position as an incident of the trigger moving from its rest position into its operating position.

The invention contemplates both direct and indirect engagement between the trigger and actuation plate, the force transmission arms and bail arms, and actuation plate and force transmission arms.

In one form, the force transmission arms are normally biased towards their third position.

The first and second force transmission arms may be pivotable about substantially parallel axes between their third and fourth positions with the pivot axes being transverse to the first axis.

In one form, the cooperating structure on the force transmission arms and bail arms is a pin and shoulder arrangement, with one each on the cooperating bail arms and force transmission arms.

In one form, the rotor has a body defined by an annular wall which bounds an internal space and at least one of the force transmission arms projects through the annular rotor wall so that a portion of the one force transmission arm resides in the internal space in the path of the actuation plate moving from its retracted position into its extended position.

This arrangement allows for an overall compact construction of the reel. Another advantage that may be realized with the internal construction is the shielding of the bail operating mechanism, making it less prone to failure.

In another aspect of the invention, the bail assembly has a line receptacle to accept fishing line projecting from the line storage spool with the bail in a cast position. Structure blocks the fishing line in the line receptacle with the bail assembly in the cast position to thereby permit a user to cock the fishing reel and throw the reel with the bail assembly in the cast position without the user's having to directly touch the line.

In one form, the blocking structure is a cantilevered projection on one of the first and second force transmission arms.

Use of the blocking projection makes even more desirable the staggered actuation of the bail arms. The force transmission arm without the projection can be initially operated, and subsequently the force transmission arm with the projection can be operated to drive the projection fully into the desired blocking position with the bail assembly in its cast position.

Another aspect of the invention is the provision of a trigger having a U-shaped end with spaced legs to engage the actuation plate on diametrically opposite sides of the first axis. This accounts for a balanced and positive force being transmitted to the actuation plate which in turn effects an even exertion of an operating force on the bail arms. This feature further contributes to smooth operation of the reel.

The invention further contemplates a fishing reel having a frame, a rotor mounted to the frame for rotation about a first axis, a line storage spool, structure for rotating the rotor, a bail assembly on the rotor and movable between (a) a first position wherein the bail assembly is in a retrieve position and directs line onto the spool as the rotor is rotated and (b) a second position wherein the bail assembly is in a cast position, a bail actuator, and structure responsive to operation of the bail actuator for exerting a force on the bail assembly simultaneously at first and second space locations on the bail assembly to pivot the bail arms from their first position towards their second position.

Preferably, the spaced locations are at diametrically opposite locations relative to the rotor axis to effect an even distribution of operating forces.

Another aspect of the invention is the use of a trigger with a single, L-shaped piece to define a finger engaging portion and a portion to engage the actuation plate.

In another aspect of the invention, the rotor has axially spaced front and rear ends and the pivot axes for the first and second force transmission arms are substantially parallel to the pivot axes for the bail arms and spaced axially rearwardly therefrom.

In one form of the invention, the pivot axes for the first and second force transmission arms are offset from each other.

DETAILED DESCRIPTION OF THE DRAWINGS

In FIGS. 1–13, a spinning-type fishing reel is shown at 10 having incorporated therein a preferred form of bail operating mechanism according to the present invention. Before the details of the invention are described, the overall reel operation will be briefly described to set the environment for the present invention.

Figure 1:
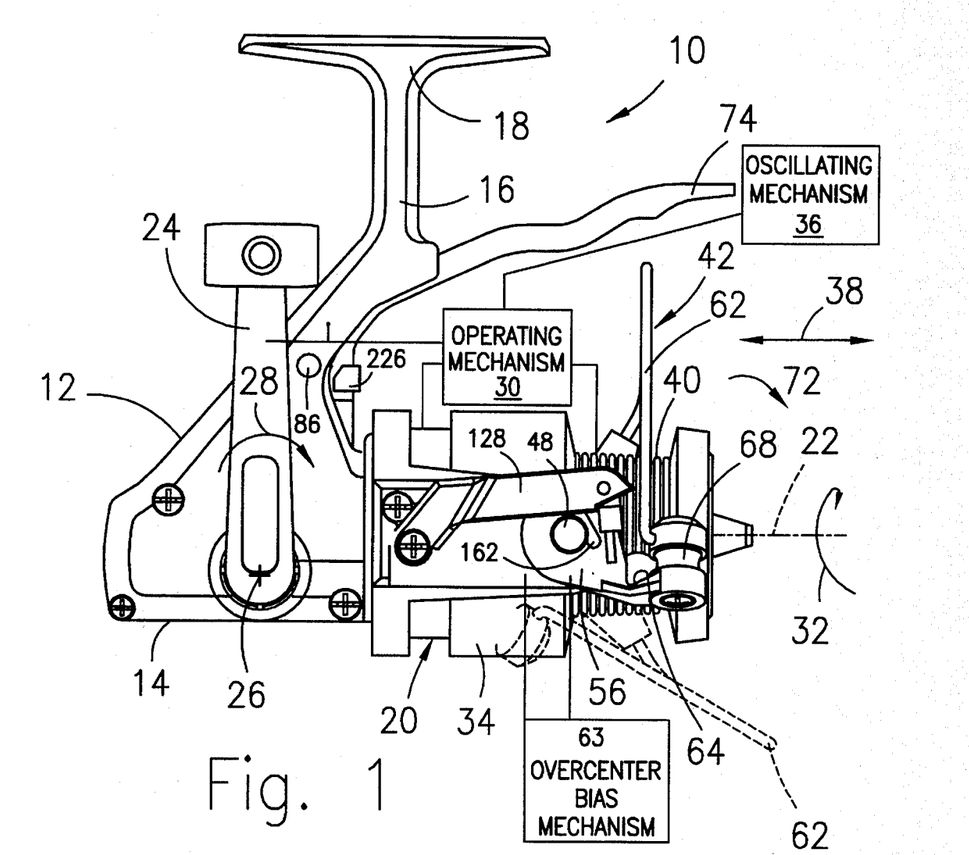
FIG. 1 is a side elevation view of a spinning-type fishing reel incorporating a bail assembly operating mechanism according to the present invention.

The spinning reel 10 has a frame 12 with a housing 14 that contains the internal operating mechanism for the reel 10. A detailed description of the reel operating mechanism is unnecessary to understand the present invention. A detailed description of the operating mechanism is given in U.S. Pat. No. 4,676,450, which is incorporated herein by reference.

The frame housing 14 extends upwardly to define a mounting stem 16, which terminates in a mounting foot 18 that can be attached to a fishing rod (not shown) in conventional fashion.

The frame 12 carries a rotor 20 at its forward end. The rotor 20 is mounted to the frame 12 for rotation about a fore and aft axis 22. Rotation is imparted to the rotor 20 by a crank handle 24. Rotation of the crank handle 24 about a laterally extending axis 26, in the direction of arrow 28, through an internal operating mechanism, shown schematically at 30 in FIG. 1, effects rotation of the rotor 20 about the axis 22 in the direction of arrow 32, i.e. in a clockwise direction as viewed from the front of the reel 10.

The rotor 20 is configured to direct line onto a line carrying spool 34 in a wrapping motion. An internal oscillating mechanism 36, also operated by the crank handle 24, moves the spool 34 in a reciprocating fore and aft path, as indicated by the double-headed arrow 38, so that line 40 is distributed evenly along the length of the line carrying spool 34.

Line 40 is wrapped around the spool 34 by a bail assembly at 42. The bail assembly 42 is attached to the rotor 20 and, more particularly, to mounting ears 44,46 at diametrically opposite locations on the rotor 20. The mounting ears 44,46 have laterally outwardly extending mounting posts 48,50 which project into through bores 52,54 on bail arms 56,58, respectively, to thereby support the bail arms 56,58 for pivoting movement about a common axis 60. A U-shaped bail wire 62 has its ends connected to the bail arms 56,58 so that the bail arms 56,58 and bail wire 62 rotate as a unit between the retrieve position, shown in solid lines in FIG. 1, and the cast position, shown in phantom lines in that same figure. An overcenter bias structure, shown schematically at 63 in FIGS. 1 and 3, drives the bail assembly into each of the cast and retrieve positions as the bail assembly approaches each. Suitable overcenter bias structures are well known to those skilled in the art.

The bail arm 56 has a line receptacle 64 defined cooperatively by a wall 66 on the bail arm 56 and a line roller 68. The receptacle 64 Is generally U-shaped and opens in the direction of advancement of the rotor 20 during line retrieval.

The line 40 normally projects from the spool 34 through an opening 70 defined at the juncture of the wall 66 and line roller 68. The line roller 68 guides line 40 that is paying out as the spool 34 rotates with the rotor 20 stationary, as when a fish overcomes the normal drag force exerted on the spool 34. As the rotor 20 is rotated in the direction of arrow 32, to retrieve the line 40, the line 40 slides down the line roller 68 and into the receptacle 64, whereupon the wall 64 and/or line roller 68 draw the line 40 around the oscillating spool 34.

Figure 2:
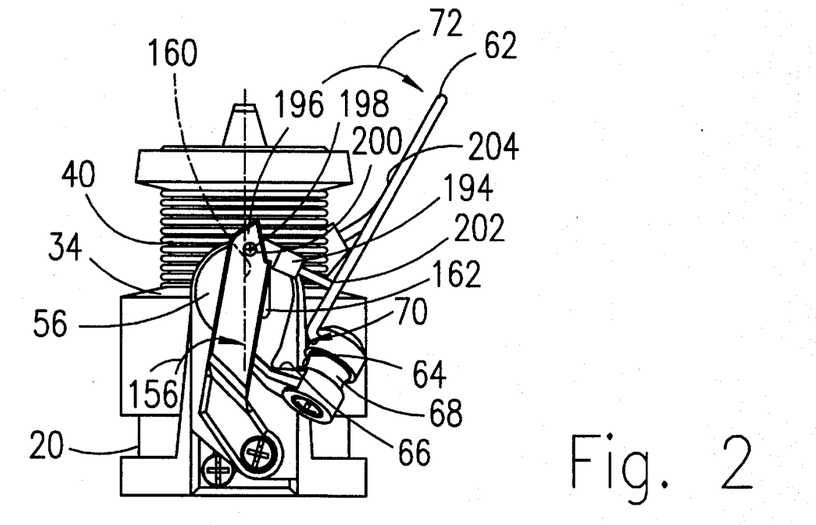
FIG. 2 is an enlarged, side elevation view of a rotor on the reel in FIG. 1 with the bail assembly thereon in a cast position.
Figure 3:
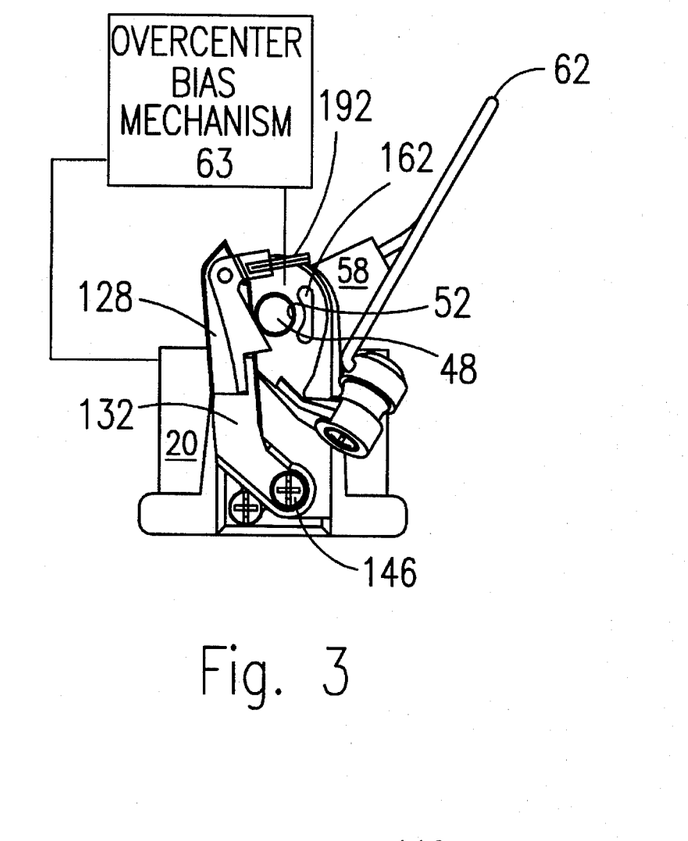
FIG. 3 is a view as in FIG. 2 with a force transmission arm partially broke away and pivoted to expose the cooperating structure on the force transmission arm and the bail assembly.
Figure 4:
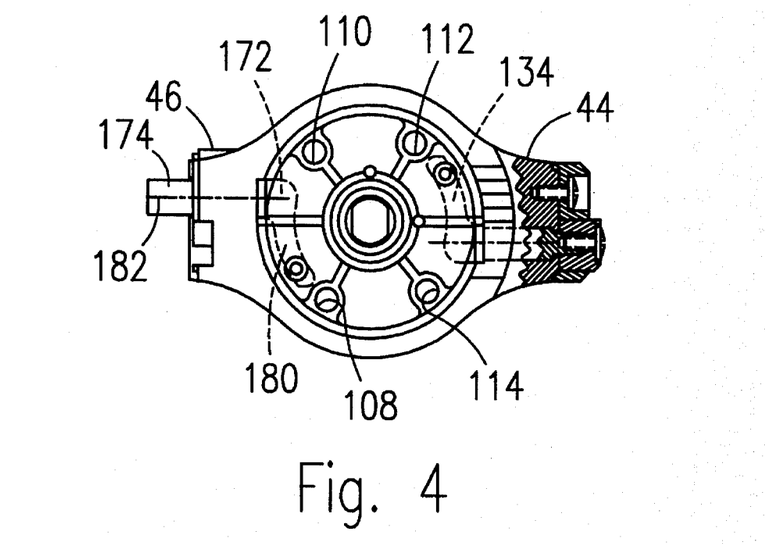
FIG. 4 is an enlarged, rear elevation view of the rotor.
Figure 5:
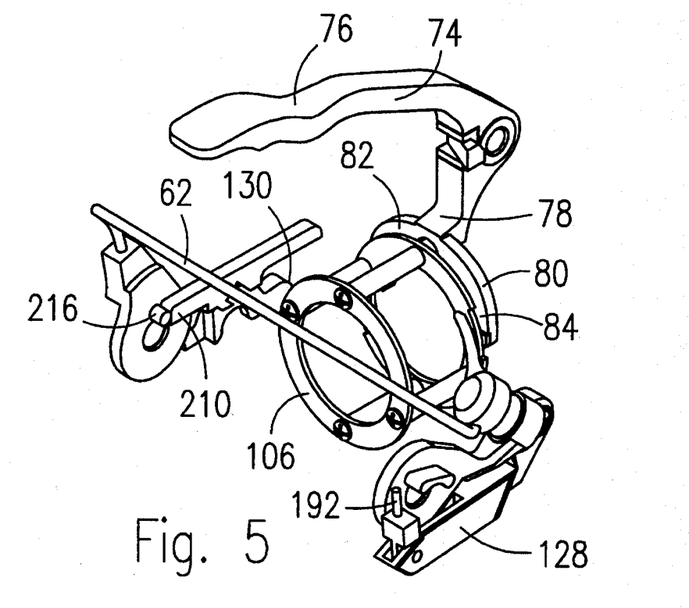
FIG. 5 is an isolated perspective view of the bail operating mechanism, according to the present invention, in a cast mode.
Figure 6:
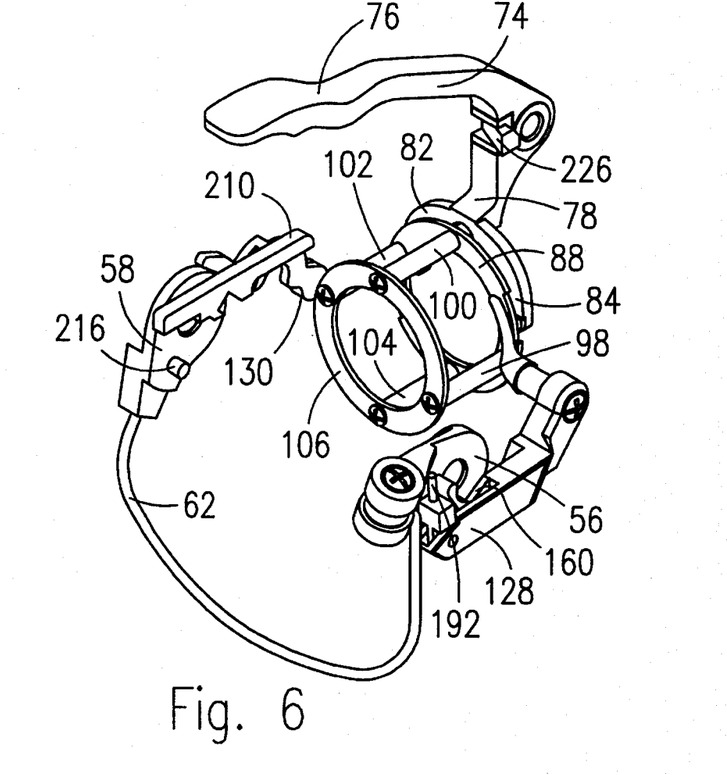
FIG. 6 is a view as in FIG. 5 with the bail assembly in a retrieve mode.

By pivoting the bail assembly 42 in the direction of arrow 72 in FIGS. 1 and 2, the bail assembly 42 is placed in the cast position. In the cast position, the line 40 is allowed to freely pay off of the spool 34. Once the desired amount of line 40 is paid out, the crank handle 24 is operated to automatically reposition the bail assembly 42 in the retrieve position through a mechanism according to the invention, that will be described in detail below.

More particularly, the present invention is directed to a mechanism for placing the bail assembly 42 into the cast position from the retrieve position therefor and for causing the bail assembly 42 to automatically move back into the retrieve position upon the completion of the cast.

The present invention employs a bail assembly actuator in the form of a trigger 74. The trigger 74 has an overall "L" shade with an elongate forwardly projecting finger engaging portion 76 and a transverse bail actuating portion 78. The bail actuating portion 78 terminates in a U-shaped yoke 80 with spaced legs 82,84. The trigger 74 is mounted to the frame 12 by a pin 86 for pivoting movement about a laterally extending axis between a rest position, shown in FIGS. 1 and 6, and an operating position, shown in FIG. 5. The trigger 74 is spring loaded towards its rest position.

Drawing up on the finger actuating portion 76 of the trigger 74, and moving the trigger 74 from its rest position to its operating position, advances the legs 82,84 forwardly into engagement with an annular, actuation plate 88. The actuation plate 88 operates within an internal space 90 defined by an annular wall 92 on the body 94 of the rotor 20. A mounting wall 96 serves as a support for the actuation plate 88 and guides movement of the actuating plate in a fore and aft direction. The actuation plate 88 is connected to four guide posts 98,100,102,104, which are spaced equidistantly around the circumference of the actuation plate 88. The preferred means for interconnecting the guide posts 98,100, 102,104 and actuation plate 88 is described below. The guide posts 98,100,102,104 are of equal length, elongate and project substantially parallel to each other in a fore and aft direction, i.e. parallel to the center axis of the actuation plate 88.

To stabilize the posts 98,100,102,104, an annular reinforcement plate 106, having a configuration similar to the plate 88, is mounted to the free ends of the posts 98,100, 102,104. The plates 88,106 and posts 98,100,102,104 together define a unitary plate assembly.

Prior to assembly of the reinforcement plate 106, the posts 98,100,102,104 are directed through bores 108, 110,112,114, consecutively, from the rearwardly facing side 116 of the wall 96, until the posts 98,100,102, 104 project beyond the front, forwardly facing surface of the wall 96. Once the reinforcement plate 106 is attached to the posts 98,100,102, 104, as by screws 120, the wall 96 is held captive between the actuating and reinforcement plates 88,106.

In one form, the posts 98,100,102,104 have a circular cross section taken transversely to their length. The bores 108,110,112,114 have a corresponding cross section to accept and guide the posts 98,100,102,104 in a fore and aft direction. This described guide arrangement assures that the movement of the entire plate assembly is consistently linear in a fore and aft line. The trigger legs 82,84 act on the rearwardly facing surface 122 of the plate 88 at diametrically opposite locations thereon to distribute the bail operating force from the trigger substantially uniformly across the plate 88 and avoid canting of the plate assembly.

The actuation plate 88 is normally biased in a rearward direction. This is accomplished by providing springs 124 (one shown) around each of the posts 98,100, 102,104 so that the springs 124 act between the rearwardly facing surface 116 of the wall 96 and the actuation plate 88.

As the actuation plate 88 is translated forwardly from a retracted position into an extended position by the trigger 74, the actuation plate 88 acts against and simultaneously pivots the force transmission arms 128,130 to cause the force transmission arms 128,130 to drive their associated bail arms 56,58 into their cast position.

The force transmission arm 128 consists of first and second joinable parts 132,134. The transmission arm part 132 is situated externally of the reel whereas the transmission arm part 134 is located primarily within the rotor space 90. The arm part 134 has a cylindrical shaft 136 that projects fully through a bore 138 in the rotor wall 92 to be exposed externally of the rotor body 94. The exposed portion 140 of the arm part 134 has flats 142,144 to make keyed connection with a correspondingly configured bore in the arm part 132. A screw 146 maintains the coupled arrangement of the arm parts 132,134 through the rotor wall 92.

The arm part 134 has an elongate, curved extension 148 projecting transversely to the length of the shaft 136. The free end 150 of the extension 148 has a curved cam edge 152 which abuts to the forwardly facing surface 154 on the actuation plate 88. As the actuation plate moves from its retracted position into its extended position, the actuation plate 88 effects rotation of the extension 148, and the arm part 132 keyed thereto, in the direction of arrow 156 about the axis 158 of the shaft 136.

As the extension 148 is pivoted by the actuation plate 88, a shoulder 160 on the arm part 132 is brought to bear against a kidney-shaped pin/projection 162, which is offset radially outwardly and forwardly from the pivot axis 60 for the bail arm 56. Pivoting of the arm part 132 exerts a force on the bail assembly 42 to pivot the same in the direction of arrow 72 towards a cast position.

A coil spring 166 acts between the wall 96 and free end 150 of the extension 148 to normally bias the force transmission arm 128 oppositely to the direction of arrow 156. Bosses 168,170 are provided on the wall 96 and extension 148 respectively to penetrate and maintain the coil spring 166 in position.

The force transmission arm 130 has a similar two-part construction including an arm part 172 within the rotor space 90 and having a keyed projection 174 to mate with an arm part 176 externally of the rotor. A screw 178 maintains the keyed connection of the arm parts 172,176.

The arm part 172 has an extension 180 that is acted upon by the actuation plate 88 to effect rotation of the arm part 176 about the axis 182 of the projection 174 on the arm part 172. A similar spring biasing structure (not shown) biases the extension 180 normally into contact with the actuation plate 88.

Forward movement of the actuation plate 80 pivots the arm 130 about the axis 182 in the direction of arrow 184. A shoulder 186 engages a pin 188. With the bail arm 58 in the solid line, retrieve position shown in FIG. 7, the pin 188 resides axially rearwardly of the bail assembly pivot axis 60. Pivoting of the arm 130 in the direction of arrow 184 effects a counterpivoting of the bail arm 58 in the direction of arrow 190.

The arms 130,132 pivot oppositely to each other about their respective axes 182,158. The axes 158,182 are parallel to but slightly offset from each other.

A further aspect of the invention is to configure the pins 162,188 and shoulders 160,186 so that there is a slight lag in operation of the pin 162 and shoulder 160 upon the trigger 74 being actuated. The pin 188 and shoulder 186 are relatively situated with the reel in a retrieve mode so that upon the actuating plate 88 moving forwardly, the shoulder 186 is abutted to the pin 188 and optimally oriented to develop a large torque on the bail arm 58. This large force that is produced as the bail assembly 42 is moved from a stationary position is often compromised in conventional structures to add to the pivot range. Once the bail arm 58 pivots in the direction of arrow 190 a predetermined amount, the shoulder 160 confronts the pin 162. The pin 162 and shoulder 160 are configured to allow the arm 128 to positively drive the bail arm 56 fully into the retrieve position of FIG. 2. In the absence of this arrangement, the shoulders 160,186 and pins 162,188 would have to be configured to all simultaneously coact, in which event the pivoting range for the bail assembly 42 would be limited to the range permitted by each pin and shoulder. Normally this range is on the order of 120° and difficult to achieve effectively with the conventional construction, given the normal space constraints and manufacturing tolerances. As noted above, this conventional construction compromises the initial force that moves the bail assembly 42 from the stationary retrieve position. With the staggered arrangement, the pivot range can be extended without sacrificing the necessary starting force.

This feature is particularly desirable with reels incorporating a line holding pin 192. The pin 192 projects in cantilever fashion from an L-shaped support arm 194 pivotably mounted to the free end 196 of the arm 128 for rotation about an axis 198 defined by a mounting pin 200. As the arm 128 drives the bail arm 56 into the cast position, the pin free end 202 abuts the edge 204 of the bail wire 62 to thereby block the line in the receptacle 64. Reserve travel for the bail assembly is built into the pin 162 and shoulder 160 arrangement to allow positive clamping of the pin free end 202 to the bail wire edge 204 so that the forces during casting do not overcome the clamping force of the line holding pin 192 that might cause premature line release.

With the inventive structure, pulling up on the trigger 74 moves the bail assembly 42 from the retrieve position into the cast position therefor. At the same time, the pin 192 blocks the line in the line receptacle 64, thereby obviating the need to snub the line 40 against a rod as the rod and reel are cocked in preparation for a cast. To complete the cast, the rod and reel 10 are thrust forwardly and simultaneously the trigger 74 is released. Upon release of the trigger 74, the arm 128 pivots under the force of the spring 166 to back the pin 192 off of the bail wire 62 to allow the line 40 to pay freely off of the spool 34.

Another significant aspect of the present invention is that the bail assembly 42 is movable through the trigger 74 from the retrieve position into the cast position regardless of the rotational position of the bail assembly 42. Thus, no self-centering mechanism is necessary, as is common on prior art reels which have a rotor that is operable in only a very small range of positions. The user need not concern him or herself with the position of the bail assembly 42 with the inventive structure.

Another aspect of the present invention is a novel mechanism at 206 to prevent jamming of the bail assembly 42 as it moves from the retrieve position to the cast position and for returning the bail assembly 42 from the cast position to the retrieve position upon rotation of the crank handle 24 at the completion of a cast.

Figure 7:
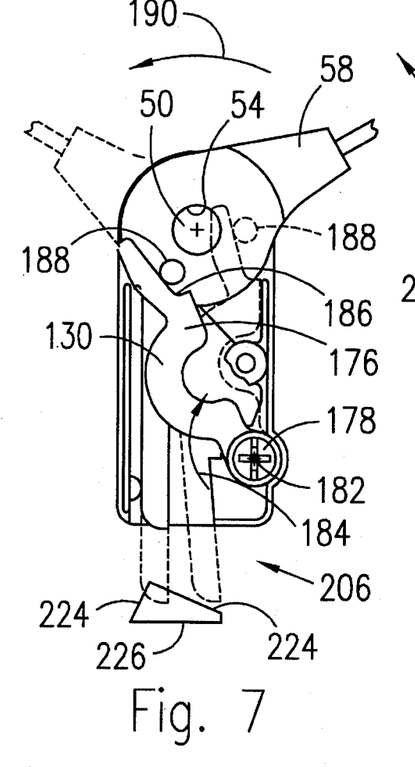
FIG. 7 is an enlarged, side elevation view of one bail arm on the bail assembly in relationship to one of two force transmission arms used to effect rotation of the bail assembly and further showing a trip mechanism, according to the present invention, for preventing jamming of the bail assembly as it moves from a retrieve position to a cast position.
Figure 8:
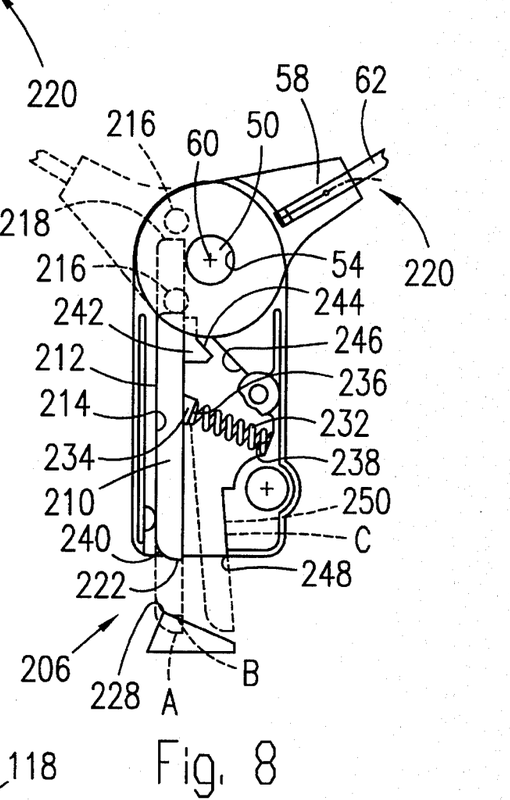
FIG. 8 is a view as in FIG. 7 with the force transmission arm removed.
Figure 9:
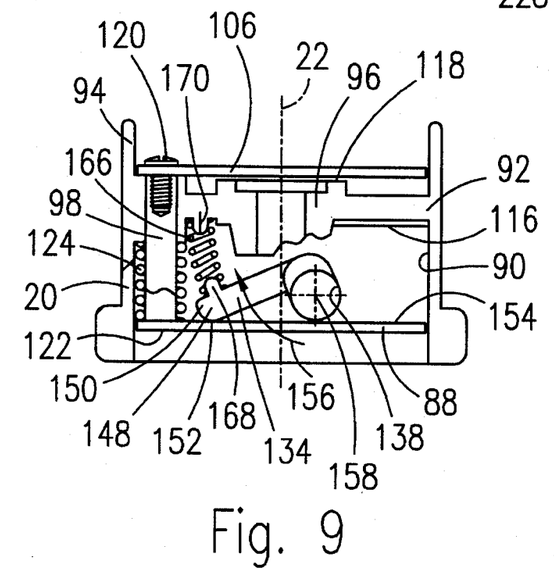
FIG. 9 is a sectional view of the rotor showing a translatable plate assembly for transmitting an operating force from the trigger to the force transmission arms.
Figure 10:
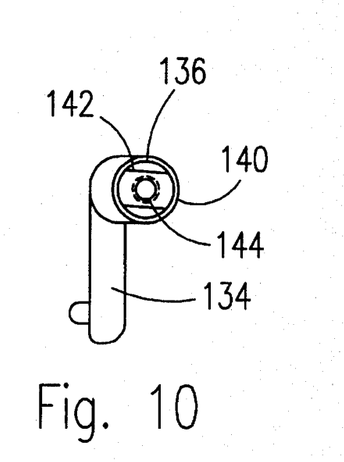
FIG. 10 is a side elevation view of an internal part of one of the force transmission arms.
Figure 11:
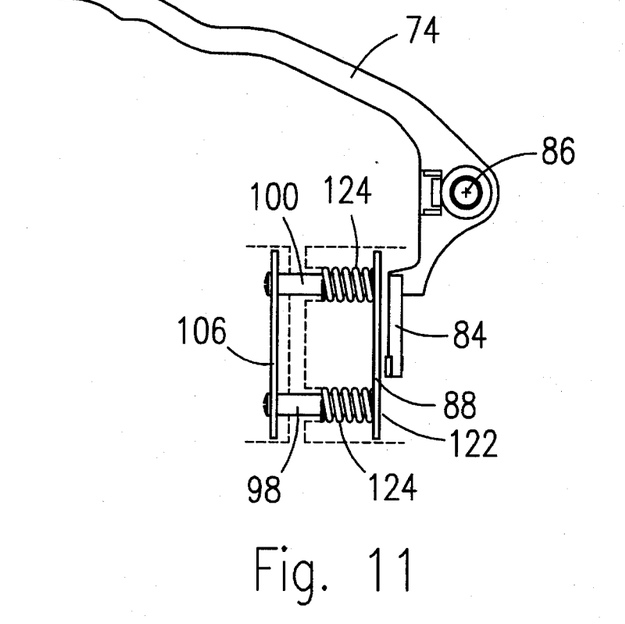
FIG. 11 is an isolated, side elevation view of the trigger in relationship to the plate assembly and with the trigger in a rest position.
Figure 12:
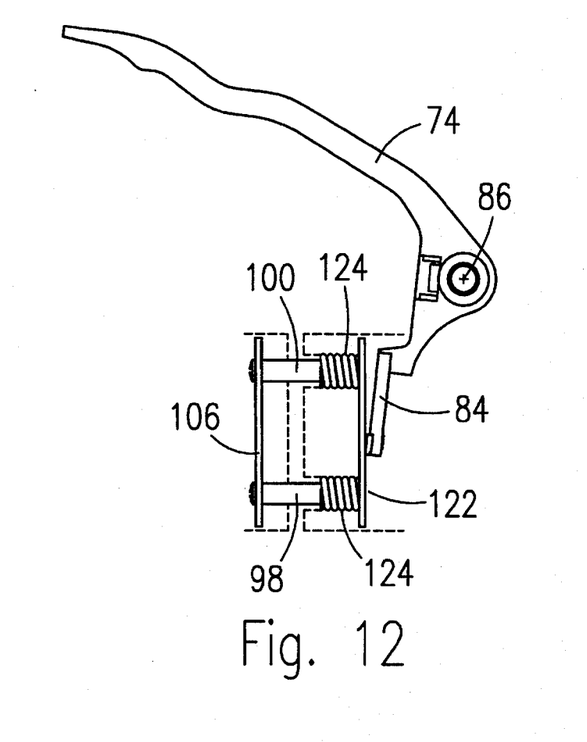
FIG. 12 is a view as in FIG. 11 with the trigger in an operating position.
Figure 13:
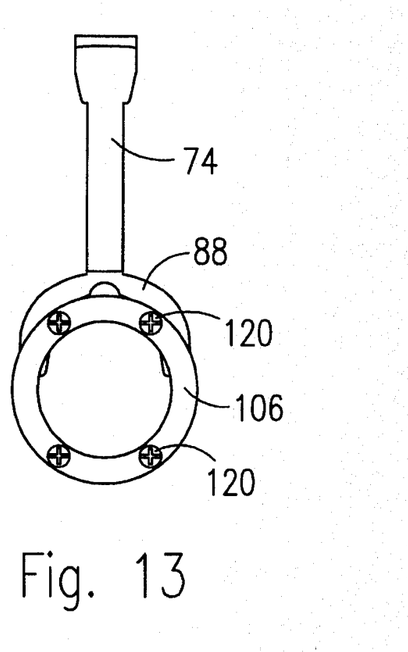
FIG. 13 is a front elevation view of the,. trigger and plate assembly.

A trip link 210 cooperates with the bail arm 58 and is movable thereby from the solid line retracted position in FIGS. 7 and 8 to the extended phantom line positions, as the bail assembly moves from its retrieve position into its cast position.

The trip link 210 has a substantially straight edge 212 which engages and is guided along a straight guide surface 214 defined by the rotor 20. Preferably, the edge 212 and surface 214 are straight so that the trip link 210 moves linearly between the solid line position and the phantom line position. It is not necessary, however, that the predetermined path followed by the trip link 210 be linear.

The bail arm 58 has an inwardly projecting pin 216 that engages and drives one trip link end 218 as the bail assembly 42 rotates in the direction of arrow 220 in FIGS. 7 and 8. Upon the bail assembly 42 being placed in the cast position, the opposite free end 222 of the trip link 210 projects to the phantom position A, shown in FIG. 8. Once the cast is completed, the user rotates the crank handle 24, which bears the extended trip link end 222 against a shoulder/ramp surface 224 on a trip link actuator 226 mounted on the trigger 74, as shown in FIG. 1.

The present invention comprehends a mechanism for allowing at least a portion of the trip link 210 to be deflected out of its predetermined path so that the trip link will not jam with the actuator 226. In the absence of this mechanism, there is a "dead spot" where the bail assembly 42 cannot be automatically actuated. More specifically, if the trip link free end 222 is aligned over the apex 228 of the actuator 226 as the trigger 74 is actuated, the end 222 encounters the apex 228, as seen in phantom position B in FIG. 8, so that the movement of the trip link 210 is arrested which thereby blocks movement of the bail assembly 42 fully into the cast position.

According to the invention, the trip link 210 is mounted to the rotor 20 to be repositionable, and preferably pivotable, about its free end 218 to the phantom line position C. A coil spring 232 normally biases the trip link 210 forwardly and in a clockwise direction in FIG. 8 so that the guide edge 212 and guide surface 214 are held in abutting relationship. The trip link 210 has an enlargement 234 defining a shoulder 236. The spring 232 acts between a shoulder 238 on the rotor 20 and the shoulder 236 in biasing the trip link 210 to the solid line position of FIG. 8.

According to the invention, the free end 222 of the trip link 210 has a convex cam edge 240 which, upon encountering the apex 228 of the trip link actuator 226, deflects the free end 222 of the trip link 210 to the right in FIGS. 7 and 8 against the bias of spring 232 under the force of the pin 216 acting on the trip link end 218. The cam edge 240 is guided down the ramp surface 224 sufficiently to allow the full extension of the trip link 210 to phantom position C as the bail assembly 42 moves into the east position. The angle and circumferential extent of the ramp surface are selected to complement the angle that the trip link 210 must pivot through to allow the full requisite projection of the trip link 210.

A second enlargement 242 can be provided on the trip link 210 to define a shoulder 244 to abut a shoulder 246 on the rotor 20 to limit pivoting of the trip link 210 in a counterclockwise direction in FIGS. 7 and 8. Also, a shoulder 248 bounding a cutout in the rotor 20 abuts the trip link edge 250 to similarly limit pivoting movement of the trip link 210.

By operating the crank handle 24, the cam edge 240 on the trip link 210 encounters the ramp surface 224 to progressively urge the trip link 210 forwardly to thereby bear the trip link end 218 against the pin 216 to pivot the arm 58 sufficiently to allow the overcenter bias structure 63 to resituate the bail assembly 42 in the retrieve position.

The force transmission arm 130 is assembled in overlying relationship to the trip link 210. Consequently, the trip link 210 can be held captively in its operative position between the rotor 20 and the transmission arm 130. The rotor 20 and/or transmission arm 130 guide movement of the trip link between its extended and retracted positions.

Figure 14:
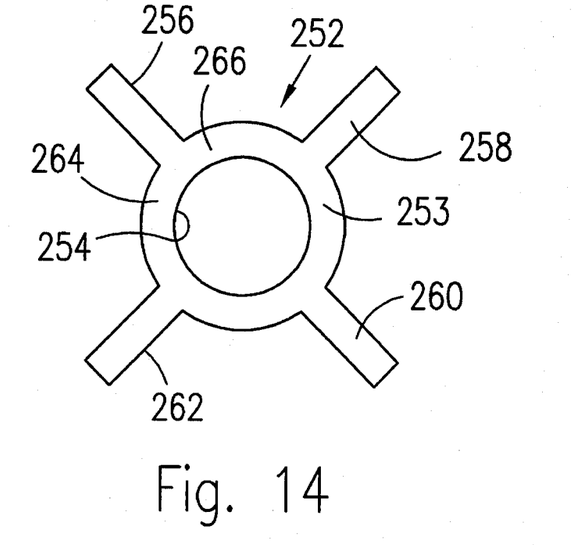
FIG. 14 is a plan view of a blank from which a unitary plate assembly can be formed.

A preferred configuration for the actuation plate assembly is shown in FIGS. 14–18. In FIG. 14, a one-piece construction for a plate assembly is shown at 252. The plate assembly consists of a single piece of sheet metal 253 that is stamped to provide a center cutout 254 and integral posts 256,258, 260,262, spaced equidistantly around the circumference of the annular center plate 264. After the stamping operation, each post 256,258,260,262 is bent through approximately 90° to project at right angles to the planar surface 266 of the plate 264.

Figure 15:
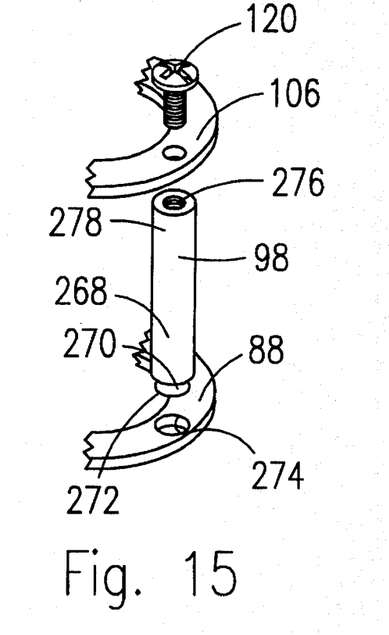
FIG. 15 is an enlarged, fragmentary, exploded perspective view of cooperating actuation and reinforcement plates and guide posts connecting therebetween according to the present invention.
Figure 16:
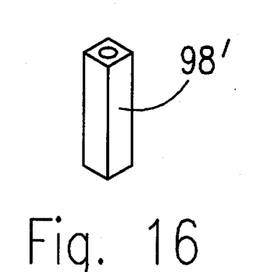
FIG. 16 is a perspective view of an alternative form of guide post on the plate assembly.

FIG. 15 shows a preferred means of connection between the actuation plate 88, one of the guide posts 98 and the reinforcement plate 106. The rear end 268 of the post 98 has a tapered portion 270 with a diameter that increases progressively from front to rear. The rear edge 272 of the post 98 has a diameter slightly larger than the diameter of a bore 274 in the plate 88 for reception of the post end 268. By press fitting the tapered portion 270 into the bore 274, the rear edge 272 deforms slightly and springs back with the post 98 fully seated in the plate bore 274 to effect a secure hold. A screw 120 is secured in a threaded bore 276 in the forward end 278 of the post 98.

Figures 17, 18, 19:
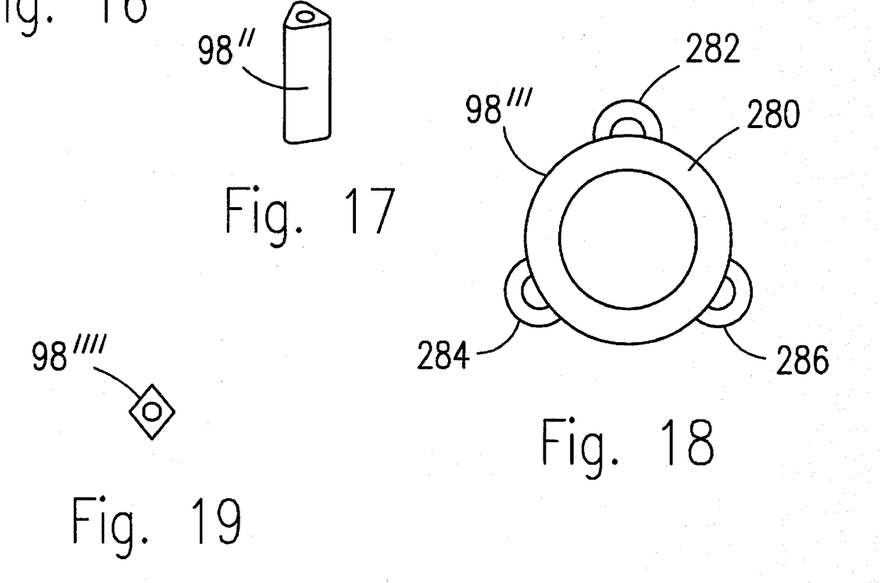
FIG. 17 is a perspective view of a still further modified form of guide post according to the present invention.
FIG. 18 is an enlarged plan view of a further modified form of guide post according to the present invention.
FIG. 19 is a plan view of a still further modified form of guide post according to the present invention.

FIGS. 16–19 show alternative shapes for the posts 98,100, 102,104. The post 98' in FIG. 16 has a rectangular cross-sectional configuration. The post 98" in FIG. 17 has a triangular cross-sectional configuration. The post 98''' in FIG. 18 has a cylindrical center portion 280 and three arcuate lobes 282,284,286 spaced equidistantly around the center portion 280. In FIG. 19 a post 98'''' is shown and has a diamond-shaped cross-sectional configuration. The guide bores 108,110,112,114 for the posts 98,98', 98", 98''', 98'''' have a matched cross section. However a non-matched cross section is often preferred. For example, if a triangular cross section is used in a round bore, there is contact by the post at only three points, however the guiding function is fully realized. Friction forces are thereby reduced.

The posts 98,98', 98", 98''', 98'''',100,102,104 can be made by any of a number of well known techniques, as by extrusion, molding, casting, etc. In place of the screws 120 and the tapered portion 270 that allows press fit connection, the plate assembly parts can be welded, bolted, riveted, or otherwise suitably interconnected.

For aesthetic purposes, covers (not shown) can be placed over the bail arms 56,58 and secured to the bail ears 44,46.

The foregoing disclosure of specific embodiments is intended to be illustrative of the broad concepts comprehended by the invention.

We claim:

1. A fishing reel comprising:

a frame;

a rotor;

means for mounting the rotor to the frame for rotation about a first axis;

a line storage spool;

means on the frame for rotating the rotor;

means on the rotor for directing line onto the line storage spool as an incident of the rotor being rotated about the first axis, said line directing means including a bail assembly comprising first and second bail arms and means for mounting the bail arms to the rotor for pivotable movement of the bail assembly between (a) a first retrieve position and (b) a second cast position;

a bail actuator that is movable relative to at least one of the frame and rotor between a rest position and an operating position; and means responsive to movement of the bail actuator from its rest position to its operating position for exerting a force on both of the bail arms to pivot the bail assembly over at least a portion of the range of movement of the bail assembly between its first position and its second position, said force exerting means including an actuation plate, means for mounting the actuation plate to at least one of the frame and rotor for movement relative thereto between extended and retracted positions, means cooperating between the bail actuator and actuation plate for moving the actuation plate from its retracted position to its extended position as an incident of the bail actuator moving from its rest position to its operating position, at least one force transmission arm, means for mounting the at least one force transmission arm to at least one of the rotor and frame for movement relative thereto between third and fourth positions independently of the bail assembly, means cooperating between the actuation plate and the at least one force transmission arm for moving the at least one force transmission arm from its third position into its fourth position as an incident of the actuation plate moving from its retracted position into its extended position, and means cooperating between the at least one force transmission arm and bail assembly for urging the bail assembly from its first position into its second position as an incident of the at least one force transmission arm moving from its third position into its fourth position.

2. The fishing reel according to claim 1 wherein the force exerting means comprises means for exerting a pivot force on only one of the first and second bail arms over a portion of the range of movement of the bail assembly between its first and second positions.

3. The fishing reel according to claim 1 wherein the rotor has diametrically opposite ears to which the bail arms are pivotably mounted, and the force exerting means includes a second force transmission arm, means for mounting the second force transmission arm to at least one of the rotor and frame for pivoting movement relative to the rotor and bail assembly between third and fourth positions, and means cooperating between the second force transmission arm and bail assembly to urge the bail assembly from its first position into its second position as an incident of the second force transmission arm moving from its third position into its fourth position.

4. The fishing reel according to claim 3 wherein the means for mounting the actuation plate to at least one of the frame and rotor comprises means for mounting the actuation plate for translatory movement relative to the at least one of the frame and rotor between the extended and retracted positions.

5. The fishing reel according to claim 4 wherein the actuation plate directly engages the force transmission arms in moving the force transmission arms from their third position into their fourth position.

6. The fishing reel according to claim 3 wherein the force transmission arms directly engage the bail arms in moving the bail assembly from its first position into its second position.

7. The fishing reel according to claim 3 wherein there are means on the rotor for normally biasing the force transmission arms towards their third position.

8. The fishing reel according to claim 3 wherein the force transmission arms are pivotable about substantially parallel axes between their third and fourth positions and the pivot axes for the force transmission arms are transverse to the first axis.

9. The fishing reel according to claim 3 wherein the means cooperating between the at least one force transmission arm and bail assembly comprises a pin on at least one of the first bail arm and the at least one force transmission arm and a shoulder on the other of the first bail arm and the at least one force transmission arm, said shoulder bearing on the pin to drive the bail assembly into its second position as the first force transmission arm moves from its third position towards its fourth position.

10. The fishing reel according to claim 3 wherein the rotor has a body defined by an annular wall, said annular wall bounding an internal space, and at least one of the force transmission arms projects through the annular rotor wall so that a portion of the one force transmission arm resides in the internal space in the path of the actuation plate moving from its retracted position into its extended position.

11. The fishing reel according to claim 1 wherein said bail actuator comprises a trigger and there are means for mounting the trigger to at least one of the frame and rotor for pivoting movement relative thereto between the rest position and the operating position.

12. The fishing reel according to claim 11 wherein the trigger directly engages the actuation plate as it effects movement of the actuation plate from its retracted position into its extended position.

13. The fishing reel according to claim 1 wherein the bail assembly has a line receptacle to accept fishing line projecting from the line storage spool with the bail assembly in a cast position and there are means on the rotor for blocking fishing line in the line receptacle with the bail assembly in a cast position to thereby permit a user to cock the fishing reel and throw the reel with the bail assembly in a cast position without the user's having to directly touch the line.

14. The fishing reel according to claim 13 wherein the blocking means comprises a cantilevered projection on one of the first and second force transmission arms.

15. The fishing reel according to claim 1 wherein the bail actuator is a trigger and the trigger has a U-shaded end with spaced legs to engage the actuation plate on diametrically opposite sides of the first axis.

16. A fishing reel comprising:

a frame;

a rotor;

means for mounting the rotor to the frame for rotation about a first axis;

a line storage spool;

means on the frame for rotating the rotor;

means on the rotor for directing line onto the line storage spool as an incident of the rotor being rotated about the first axis, said line directing means including a bail assembly comprising first and second bail arms and means for mounting the bail arms to the rotor for pivotable movement of the bail assembly between (a) a first retrieve position and (b) a second cast position;

a bail actuator;

means for mounting the bail actuator to at least one of the frame and rotor for pivoting movement about an axis; and means responsive to operation of the bail actuator for exerting a force on the bail assembly simultaneously at first and second spaced locations on the bail assembly to pivot the bail assembly from its first position towards its second position, said force exerting means including an arcuate actuation plate, means for mounting the actuation plate on at least one of the rotor and frame for movement relative thereto between extended and retracted positions, and means cooperating between the actuator plate and bail assembly for urging the bail assembly from its first position towards its second position as an incident of the actuation plate moving from its retracted position into its extended position, said bail actuator directly engaging the actuation plate as the bail actuator moves the actuation plate from its retracted position into its extended position.

17. The fishing reel according to claim 16 wherein the spaced locations on the bail assembly are at diametrically opposite locations relative to the rotor axis.

18. The fishing reel according to claim 16 wherein the first and second locations are on the first and second bail arms and the force exerting means includes first and second force transmission arms, means for mounting the force transmission arms to the rotor for pivoting movement relative to the rotor about substantially parallel axes between third and fourth positions, and means cooperating between the first and second force transmission arms and first and second bail arms for causing the first and second force transmission arms to directly engage and drive the first and second bail arms from their first position into their second position as an incident of the force transmission arms moving from their third position into their fourth position.

19. The fishing reel according to claim 18 wherein there are means cooperating between the actuation plate and force transmission arms for causing the actuation plate to directly engage each of the force transmission arms to move the force transmission arms from their third position into their fourth position as an incident of the actuation plate moving from its retracted position into its extended position.

20. The fishing reel according to claim 18 wherein there are means on the rotor for normally biasing each of the force transmission arms towards their third position.

21. The fishing reel according to claim 16 wherein the bail actuator comprises a trigger and the trigger has a single L-shaped piece defining a finger engaging portion and a portion to engage the actuation plate.

22. The fishing reel according to claim 21 wherein the rotor is defined by an annular wall, said annular wall bounding an internal space, and each of the force transmission arms projects through the annular rotor wall so that a portion of each of the force transmission arms resides in the path of the actuation plate moving from its retracted position into its extended position.

23. The fishing reel according to claim 21 wherein the rotor has axially spaced front and rear ends and the pivot axes for the first and second force transmission arms are substantially parallel to the pivot axes for the bail arms and spaced axially rearwardly therefrom.

24. The fishing reel according to claim 23 wherein the pivot axes for the first and second force transmission arms are offset from each other.

* * * * *